C. A. Moore,
Manf. Glass Articles.
No. 109,646. Patented Nov. 29, 1870.
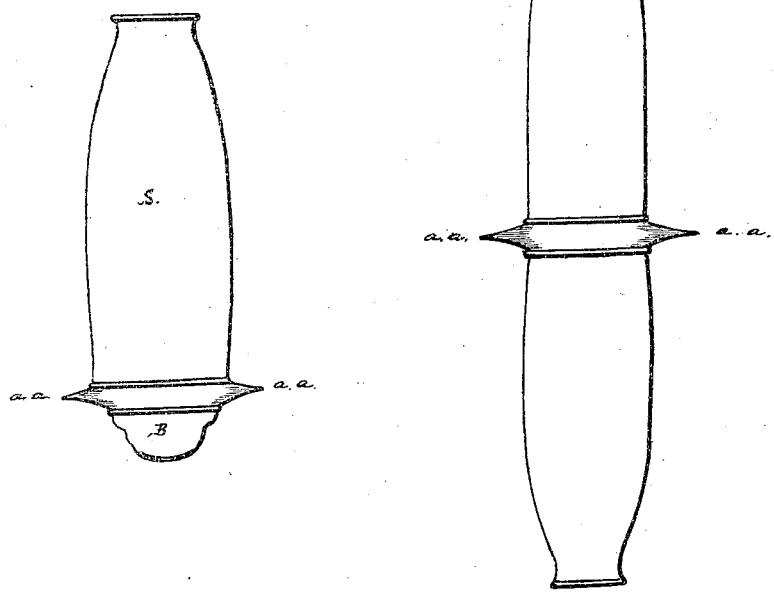
Charles E. Gayford
H. A. Moore
Witnesses.
Charles A. Moore
Inventor

United States Patent Office.

CHARLES A. MOORE, OF WESTBROOK, CONNECTICUT.

Letters Patent No. 109,646, dated November 29, 1870.

IMPROVEMENT IN THE MANUFACTURE OF GLASS ARTICLES.

The Schedule referred to in these Letters Patent and making part of the same.

*To all whom it may concern:*

Be it known that I, CHARLES A. MOORE, of Westbrook, in the county of Middlesex and State of Connecticut, have invented a new and useful Mode of Making Lamp-chimneys and Cones; and I do hereby declare that the following is a full and exact description of the same, reference being also had to the accompanying drawings and to the letters of reference marked thereon.

The nature of my invention consists in blowing a lamp-chimney and a cone together in one piece, in one and the same mold, and at one operation or blowing, and in a manner that they readily separate from each other.

The drawings—

Figure 1 is designed to represent a chimney and a cone thus blown.

The contour of fig. 1 shows the internal form of the mold in which it is made.

The V-shaped projection (the same being a groove in this mold) at *a a*, is the "blow-over" or cut-off, with which the mold is provided, it being the base of the chimney, and the base of the cone, and the point of separation of the two articles.

The glass blows so thin into the said blow-over or groove that the two articles naturally drop apart, or are readily separated by a light rap.

The common mode of making chimneys or cones is to blow them separately and to make only one cone or one chimney in one mold at one operation or blowing, the glass blowing over or thin at the bottom; also at the top of the mold.

By my invention a chimney and a cone are blown together in the same mold at one operation, the glass blowing over at three points, viz., at the top and bottom of the mold, and at the desired point of separating the chimney and cone.

With any mold-chimney a cone may thus be blown, and at a very small additional cost.

It is obvious that two cones or two chimneys may be made together in the same manner.

The object of my invention is to lessen the cost of making cones and chimneys.

Having thus described my invention,

What I claim is—

The mode of blowing lamp-chimneys and cones, or two or more articles, together, with the view of separating them from each other, substantially as and for the object set forth.

CHARLES A. MOORE.

Witnesses:
EDWARD CLARKE,
WM. BARKER.